(12) United States Patent
Singh

(10) Patent No.: US 10,241,485 B2
(45) Date of Patent: Mar. 26, 2019

(54) SMART ELECTRONIC DEVICE MANAGEMENT SYSTEM

(71) Applicant: Harpal C Singh, Murphy, TX (US)

(72) Inventor: Harpal C Singh, Murphy, TX (US)

( * ) Notice: Subject to any disclaimer, the term of this patent is extended or adjusted under 35 U.S.C. 154(b) by 315 days.

(21) Appl. No.: 15/292,381

(22) Filed: Oct. 13, 2016

(65) Prior Publication Data

US 2018/0107187 A1    Apr. 19, 2018

(51) Int. Cl.
| | |
|---|---|
| H04W 4/70 | (2018.01) |
| A01G 25/16 | (2006.01) |
| A01M 29/18 | (2011.01) |
| F24F 11/61 | (2018.01) |
| G05B 15/00 | (2006.01) |
| G05B 15/02 | (2006.01) |
| G05B 19/02 | (2006.01) |
| H04L 12/28 | (2006.01) |
| G05B 19/042 | (2006.01) |
| F24F 110/10 | (2018.01) |

(Continued)

(52) U.S. Cl.
CPC ............ *G05B 19/02* (2013.01); *A01G 25/16* (2013.01); *A01M 29/18* (2013.01); *F24F 11/61* (2018.01); *G05B 15/00* (2013.01); *G05B 15/02* (2013.01); *G05B 19/0428* (2013.01); *H04L 12/2803* (2013.01); *H04W 4/70* (2018.02); *F24F 2110/10* (2018.01); *F24F 2110/12* (2018.01); *F24F 2130/10* (2018.01); *G05B 2219/163* (2013.01); *G05B 2219/25011* (2013.01); *G05B 2219/25168* (2013.01); *G05B 2219/25419* (2013.01); *G05B 2219/2625* (2013.01); *G05B 2219/2642* (2013.01); *G05B 2219/45103* (2013.01); *G05B 2219/45106* (2013.01); *H04L 2012/2841* (2013.01)

(58) Field of Classification Search
None
See application file for complete search history.

(56) References Cited

U.S. PATENT DOCUMENTS

| | | | | |
|---|---|---|---|---|
| 4,411,385 | A * | 10/1983 | Lamkewitz | ........... B60H 1/2206 236/91 B |
| 2009/0034369 | A1 * | 2/2009 | Hill | ........................ A01M 29/18 367/139 |

(Continued)

OTHER PUBLICATIONS

Stinson, Elizabeth, "A Smart Sensor that Quantifies the Soil in Your Garden", Jun. 5, 2014, Wired. (Year: 2014).*

*Primary Examiner* — Qing Yuan Wu

(57) ABSTRACT

A smart electronic device management system is a device that is utilized to manage and control electronic devices. The device includes a housing structure that may be mounted to a surface such as a wall. A video capture device provides a live video feed of the surrounding areas while at least one environmental sensor allows monitoring of conditions in the surrounding areas. A wireless communication module allows the device to be associated with an external computing device. Various electronic devices may be connected to the device through a plurality of electrical outlets on the housing structure. A control unit allows the device to monitor and manage electronic devices that are wirelessly connected to the device or connected through the plurality of electrical outlets. The control unit is configured to calculate a sprinkler schedule using data retrieved through the wireless communication module.

13 Claims, 11 Drawing Sheets

(51) Int. Cl.
*F24F 110/12* (2018.01)
*F24F 130/10* (2018.01)

(56) References Cited

U.S. PATENT DOCUMENTS

| | | | |
|---|---|---|---|
| 2010/0030389 A1* | 2/2010 | Palmer | A01G 25/16 |
| | | | 700/284 |
| 2012/0095604 A1* | 4/2012 | Alexanian | A01G 25/16 |
| | | | 700/284 |
| 2017/0083062 A1* | 3/2017 | Bowers | H05K 7/20972 |
| 2018/0014480 A1* | 1/2018 | Montgomery | A01G 25/16 |
| 2018/0077880 A1* | 3/2018 | Stange | A01G 25/16 |
| 2018/0145844 A1* | 5/2018 | Pera | H04M 1/72533 |
| 2018/0228098 A1* | 8/2018 | Nickerson | G05B 15/02 |

* cited by examiner

SMART ELECTRONIC DEVICE MANAGEMENT SYSTEM

FIELD OF THE INVENTION

The present invention relates generally to a smart control device. More specifically, the present invention is a smart electronic device management system that is utilized to manage and control electronic devices such as timed sprinklers and lights.

BACKGROUND OF THE INVENTION

Automated control systems are becoming increasingly popular for managing various aspects of buildings. These systems enable automation of various systems such as lighting, heating, ventilation, air conditioning (HVAC), and security. Automated control systems also enable automation of appliances such as washers and dryers, ovens, and refrigerators and freezers. A typical automated control system is controlled by a central hub to which systems and appliances are connected and is managed through a user interface. The user interface is generally accessed via a wall-mounted terminal, mobile phone software, a tablet computer, or a web interface. Automated control systems may be programmed to perform various functions without any management or input from the user. In addition, the user may manually input commands through the user interface to manage the various systems and appliances that are controlled by the automated control system.

The present invention is a smart electronic device management system that enables automated management and control of electronic devices such as timed sprinklers and lights. The system is configured to calculate a sprinkler schedule using data retrieved from an external source such as a weather application program interface (API). Various electronic devices may be managed or controlled by the system by electrically connecting or wirelessly connecting the devices to the system.

DETAIL DESCRIPTIONS OF THE INVENTION

Figure 1:
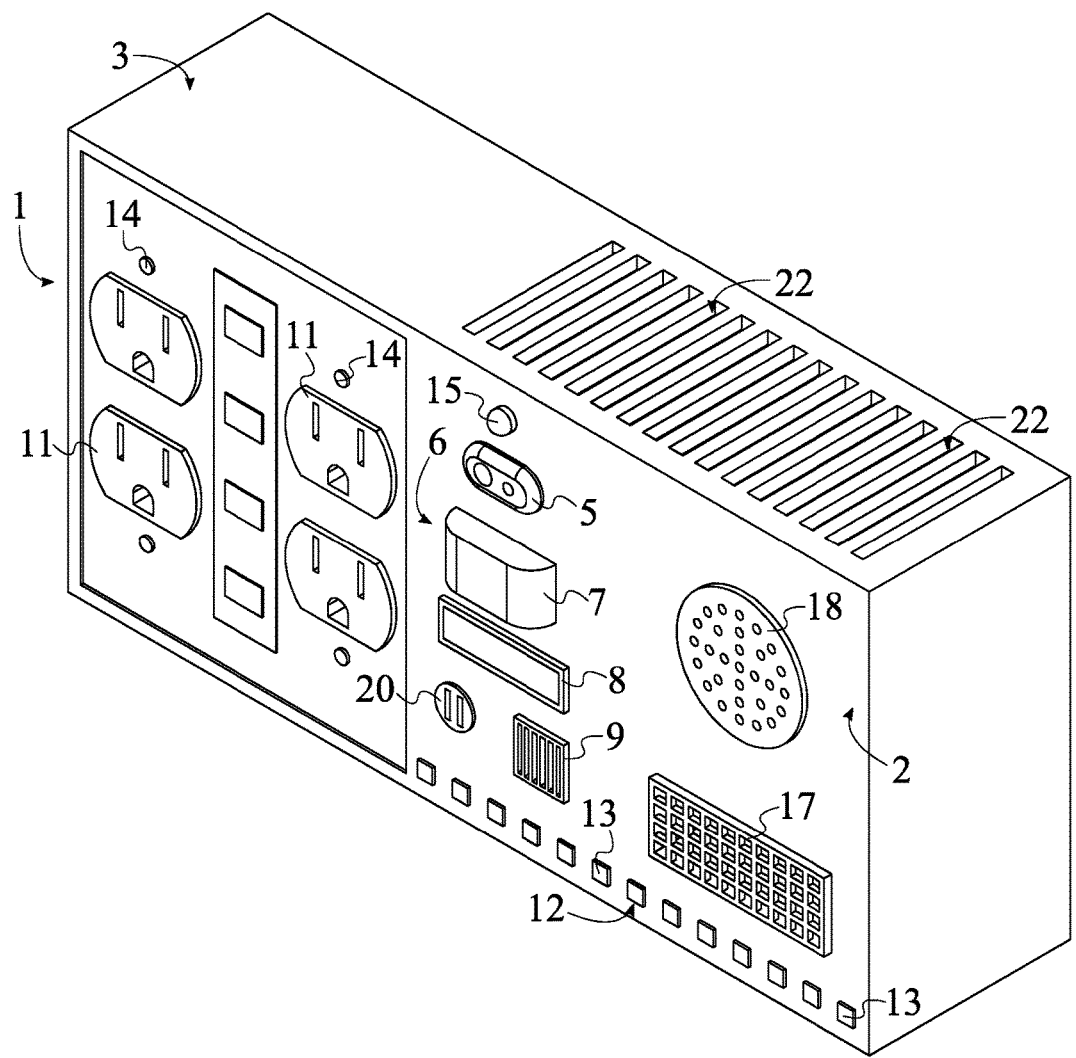
FIG. 1 is a perspective view of the present invention.

All illustrations of the drawings are for the purpose of describing selected versions of the present invention and are not intended to limit the scope of the present invention.

The present invention is a smart electronic device management system. The present invention is shown in FIGS. 1-9 and comprises a housing structure 1, a video capture device 5, at least one environmental sensor 6, a wireless communication module 10, a plurality of electrical outlets 11, a plurality of indicator lights 12, and a control unit 4.

Figure 2:
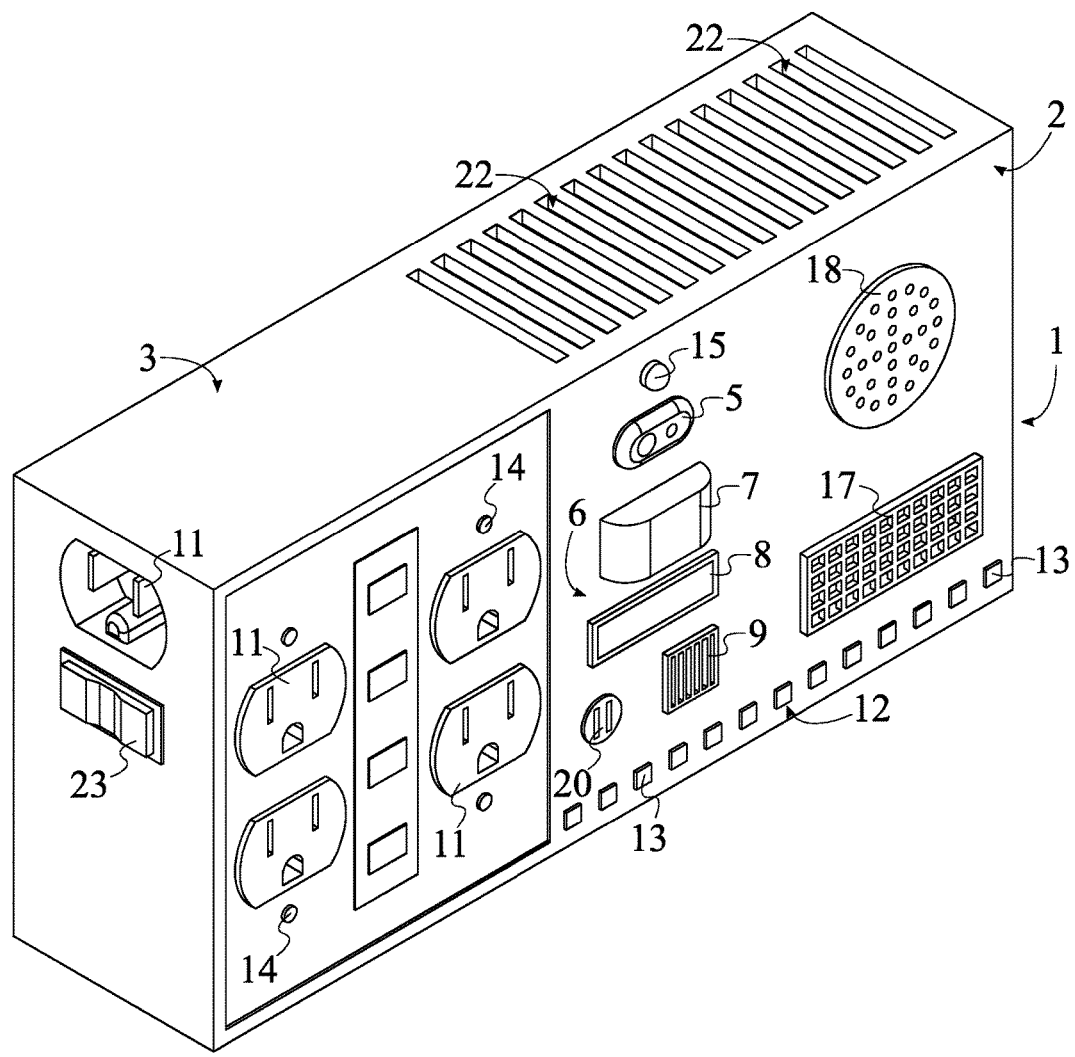
FIG. 2 is an additional perspective view of the present invention.
Figure 3:
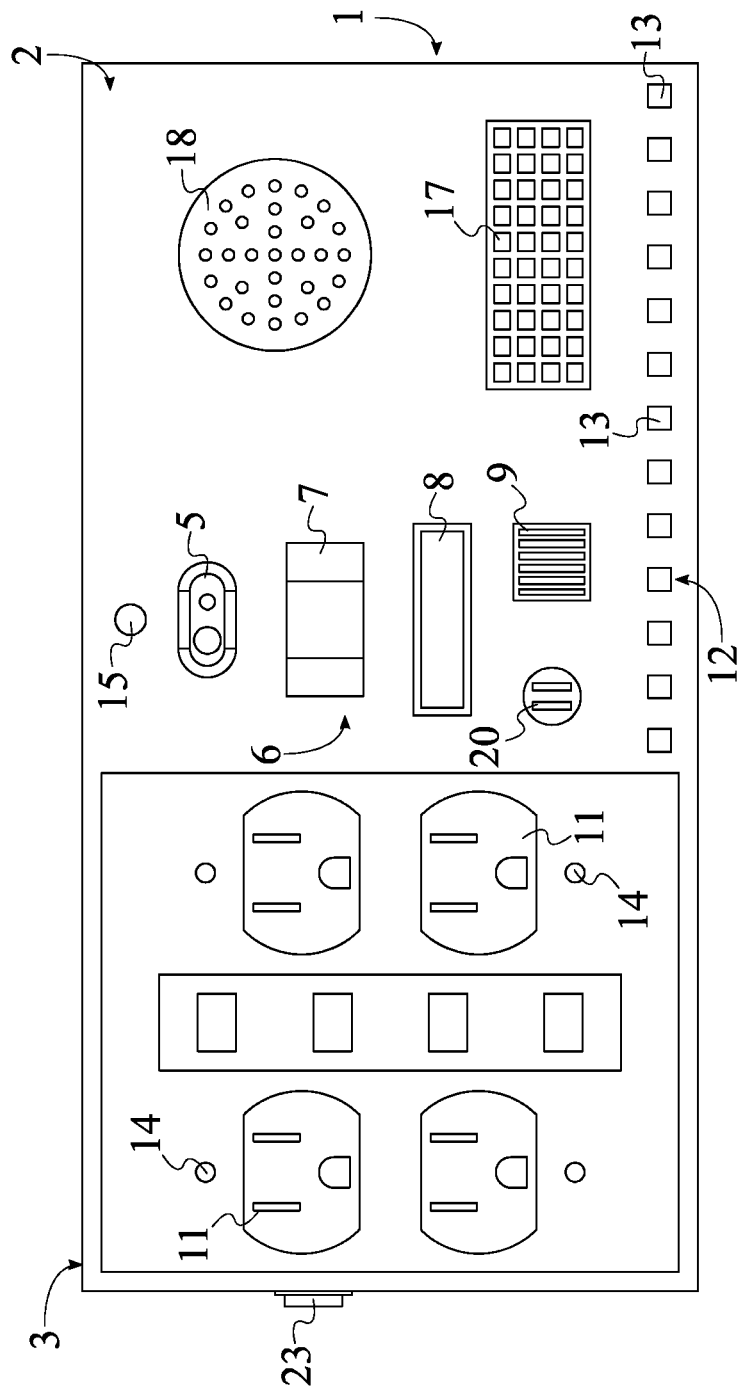
FIG. 3 is a front view of the present invention.

With reference to FIGS. 1-3, the housing structure 1 serves as a protective casing for the electronic and electrical components of the present invention. The housing structure 1 comprises a front surface 2 on which numerous of the aforementioned components are positioned. The video capture device 5 is utilized to provide a live video feed of the surrounding areas of the present invention. The video capture device 5 is mounted onto the front surface 2, enabling the video capture device 5 to monitor the surrounding areas when the present invention is mounted onto a surface such as a wall. As a result, the video capture device 5 may be utilized as a security camera.

The at least one environmental sensor 6 is utilized to monitor conditions in the surrounding areas of the present invention. The plurality of electrical outlets 11 allows various electronic devices to be connected to the present invention and draw power. Additionally, the plurality of electrical outlets 11 enables the present invention to be connected to an external electrical power source. The plurality of indicator lights 12 provides a visual indicator for the status of various properties of the present invention. The at least one environmental sensor 6, the plurality of electrical outlets 11, and the plurality of indicator lights 12 are mounted into the housing structure 1 as well. These components may be positioned on the front surface 2 or on other regions of the housing structure 1.

Figure 4:
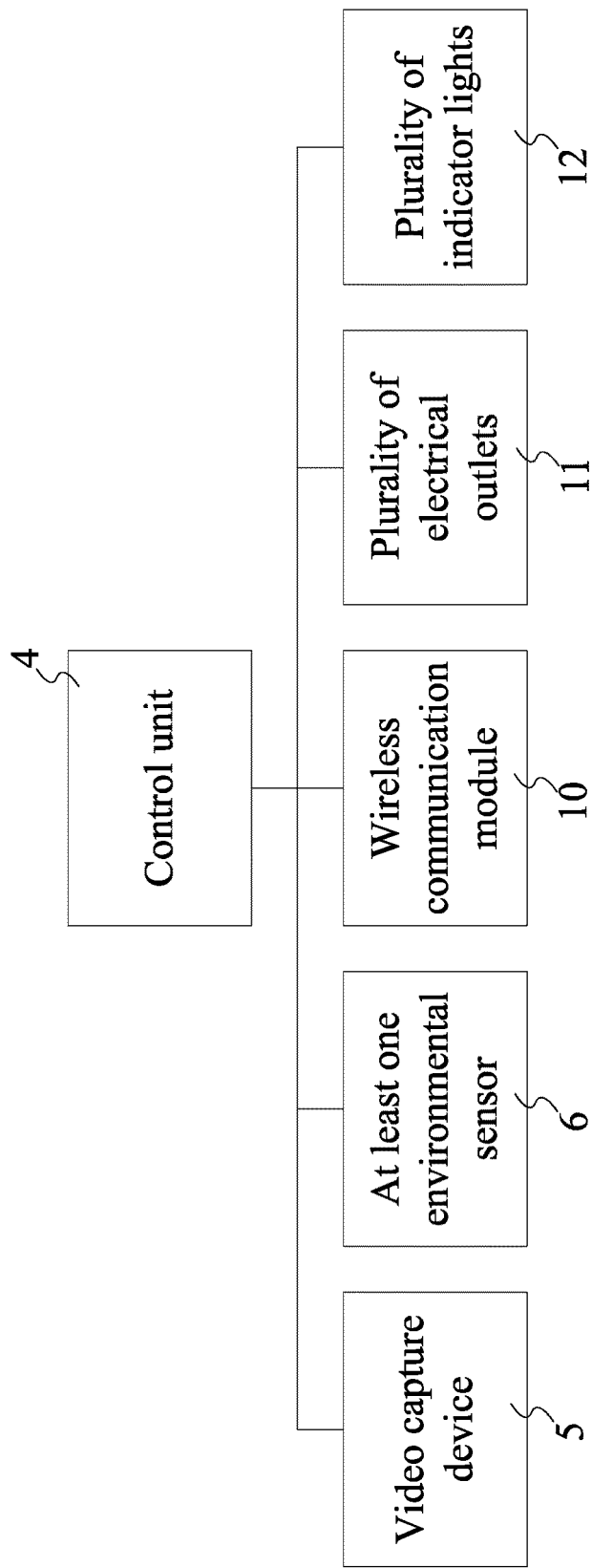
FIG. 4 is a diagram detailing electronic connections of the control unit.

With reference to FIG. 4, the control unit 4 is utilized to monitor and regulate the electronic and electrical components of the present invention, as well as process user inputted commands for the present invention. The video capture device 5, the at least one environmental sensor 6, the wireless communication module 10, the plurality of electrical outlets 11, and the plurality of indicator lights 12 are electronically connected to the control unit 4, enabling the control unit 4 to monitor and regulate these components of the present invention. The control unit 4 may activate and deactivate each of the plurality of electrical outlets 11 independently of each other. As a result, the control unit 4 is able to electrically connect or disconnect any electronic device that is connected to the present invention through the plurality of electrical outlets 11. For example, the control unit 4 may activate Christmas lights at nighttime and deactivate the Christmas lights during the daytime.

Figure 9:
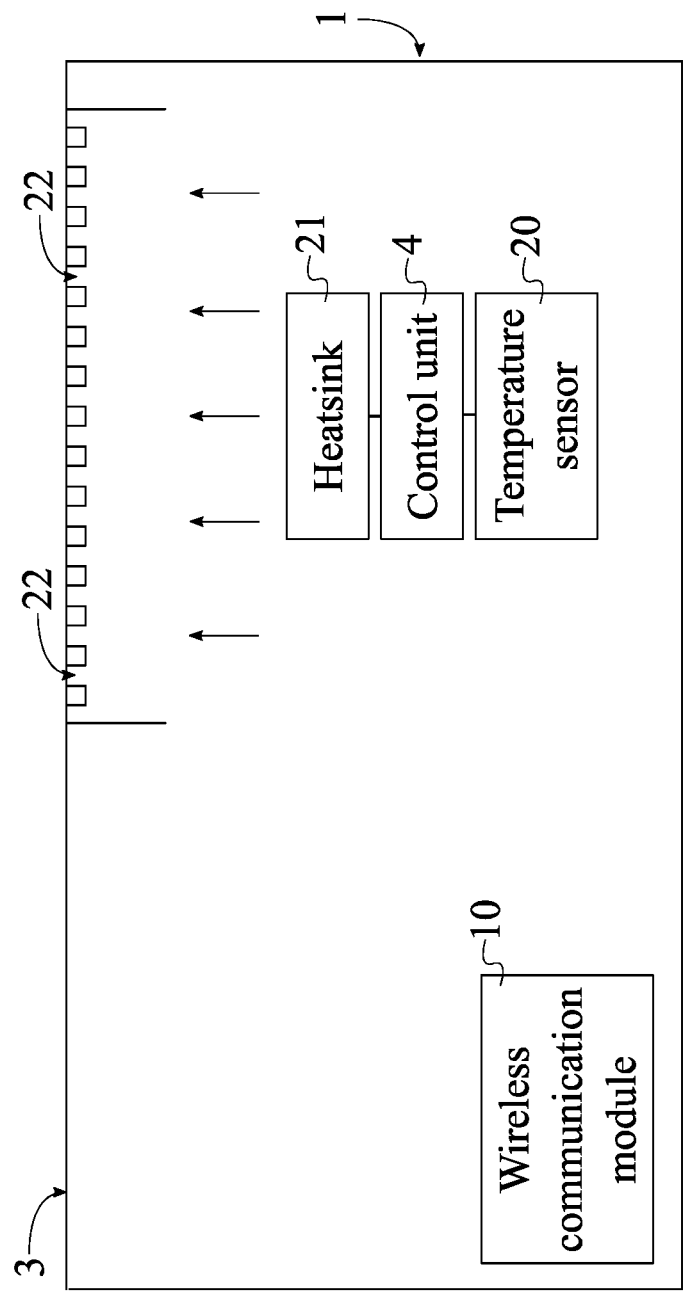
FIG. 9 is a diagram detailing positioning of the heatsink, the control unit, the temperature sensor, and the wireless communication module within the housing structure.

The wireless communication module 10 enables the present invention to be synced and associated with an external computing device such as a smartphone, tablet computer, or desktop computer. The wireless communication module 10 additionally enables two-way communication between the present invention and the external computing device. The user may thus utilize the external computing device to monitor and program the behavior of the present invention. The control unit 4 and the wireless communication module 10 are enclosed within the housing structure 1 as shown in FIG. 9, providing protection for the control unit 4 and the wireless communication module 10. The present invention includes various security features to prevent unauthorized access to the present invention as well as unauthorized access to the electronic devices that are connected to the present invention. Security features may include, but are not limited to, firewalls, Secure Sockets Layer (SSL) and Transport Layer Security (TLS) encryption, authentication and authorization using application programming interface (API) keys, one-time token based authentication and authorization, and socket-based communication.

In the preferred embodiment of the present invention, the control unit 4 is configured to calculate a sprinkler schedule for the plurality of electrical outlets 11 using data retrieved through the wireless communication module 10. More specifically, the present invention is able to receive weather data from an external source such as a weather API through the wireless communication module 10. The user is able to input the location of the present invention in order to retrieve weather data for the location such as by entering the zip code for the location. For example, if precipitation is forecasted, the control unit 4 may disable or delay the activation of the sprinklers in order to avoid wasting water. The control unit 4 may take into account additional factors such as outdoor temperature and time of day. The control unit 4 is able to process the weather data and implement the sprinkler schedule by regulating the behavior of sprinklers that are connected to the present invention through the plurality of electrical outlets 11. The control unit 4 is able to regulate the behavior of sprinklers that are wirelessly connected to the present invention as well.

Figure 5:
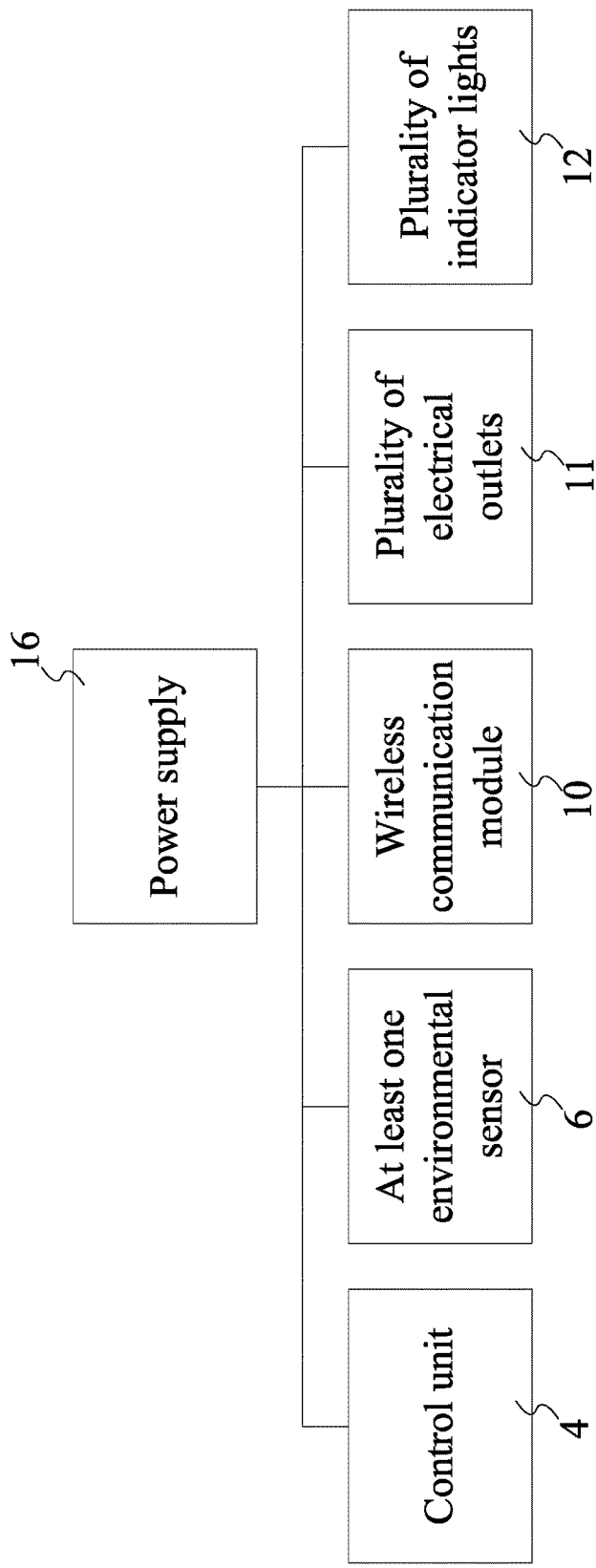
FIG. 5 is a diagram detailing electronic connections of the power supply.

With reference to FIG. 5, the present invention further comprises a power supply 16 that is utilized to provide electrical power to the electronic components of the present invention. The power supply 16 may be connected to an external electrical power source through the plurality of electrical outlets 11. Alternatively, the power supply 16 may be a rechargeable or removable battery. The power supply 16 is electrically connected to the control unit 4, the at least one environmental sensor 6, the wireless communication module 10, the plurality of electrical outlets 11, and the plurality of indicator lights 12, enabling the power supply 16 to provide electrical power to these components of the present invention. The power supply 16 may provide electrical power to additional electronic components of the present invention.

With reference to FIGS. 1-3, the at least one environmental sensor 6 may be a light sensor 8. The light sensor 8 enables the present invention to determine if a light source is present in the surrounding areas (for example, if a light is unintentionally left on inside a garage). The at least one environmental sensor 6 may also be a humidity sensor 9. The humidity sensor 9 enables the present invention to monitor the humidity level of the surrounding areas of the present invention.

Figure 6:
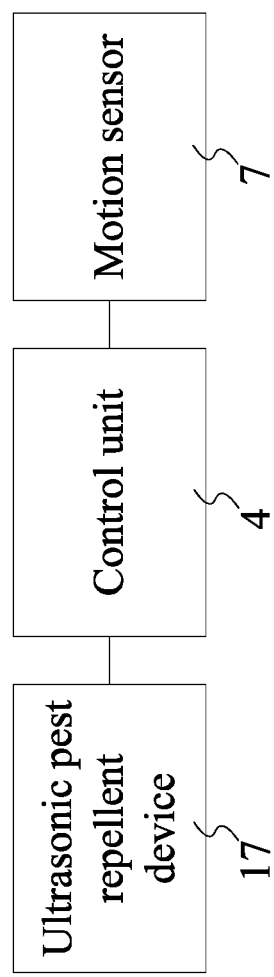
FIG. 6 is a diagram detailing electronic connections of the ultrasonic pest repellent device.

The present invention further comprises an ultrasonic pest repellent device 17. The ultrasonic pest repellent device 17 is utilized to repel pests such as mice, spiders, rats, ants, and roaches. The ultrasonic pest repellent device 17 utilizes ultrasonic sound waves and electromagnetic waves to repel pests in lieu of potentially harmful chemicals. In the preferred embodiment of the present invention, the ultrasonic pest repellent device 17 is positioned on the front surface 2, enabling the ultrasonic pest repellent device 17 to repel pests in front of the present invention when the present invention is mounted onto a surface such as a wall. The ultrasonic pest repellent device 17 is electronically connected to the control unit 4, enabling the control unit 4 to manage and regulate the ultrasonic pest repellent device 17. The at least one environmental sensor 6 comprises a motion sensor 7. The motion sensor 7 is utilized in conjunction with the ultrasonic pest repellent device 17 to enable automated activation of the ultrasonic pest repellent device 17. The motion sensor 7 is positioned on the front surface 2, enabling the motion sensor 7 to detect movement in front of the present invention when the present invention is mounted onto a surface such as a wall. As shown in FIG. 6, the motion sensor 7 is operably coupled to the ultrasonic pest repellent device 17 through the control unit 4. As a result, when movement is detected in the surrounding areas by the motion sensor 7, the control unit 4 is able to activate the ultrasonic pest repellent device 17. The motion sensor 7 and/or the ultrasonic pest repellent device 17 may be temporarily deactivated in order to prevent unintended activation (for example, if the user moves in front of the present invention).

Figure 7:
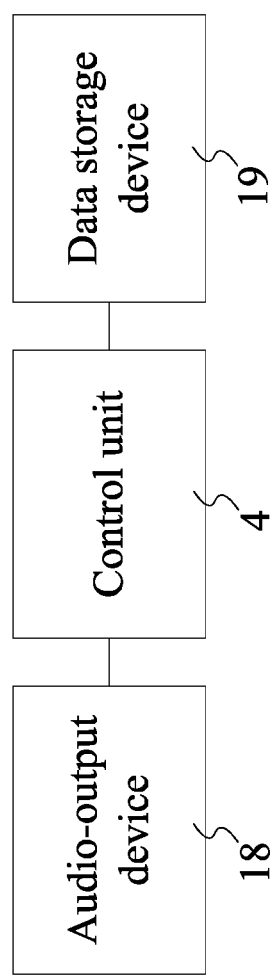
FIG. 7 is a diagram detailing electronic connections of the audio-output device.

The present invention further comprises an audio-output device 18. The audio-output device 18 is utilized to play sounds, songs, and other audio media through the present invention. The audio-output device 18 is externally positioned on the housing structure 1, enabling the audio-output device 18 to project audio to the surrounding areas of the present invention. The audio-output device 18 is electronically connected to the control unit 4 as shown in FIG. 7. As a result, the control unit 4 is able to manage and regulate the behavior of the audio-output device 18. The present invention further comprises a data storage device 19. In the preferred embodiment of the present invention, the data storage device 19 is utilized to store one or more audio files that may be played through the audio-output device 18. The data storage device 19 is electronically connected to the audio-output device 18, enabling audio files that are stored on the data storage device 19 to be played through the audio-output device 18.

With further reference to FIGS. 1-3. in the preferred embodiment of the present invention, the plurality of indicator lights 12 comprises a plurality of sprinkler zone status lights 13. The plurality of sprinkler zone status lights 13 is utilized to monitor sprinklers that are located throughout multiple zones. For example, a light from the plurality of sprinkler zone status lights 13 may be green if the sprinkler in the corresponding zone is active. Conversely, if the corresponding sprinkler is inactive, the light may be red. The plurality of sprinkler zone status lights 13 is linearly distributed on the front surface 2, allowing the user to easily assess the plurality of sprinkler zone status lights 13. The control unit 4 may be utilized to simultaneously activate all sprinkler zones in order to test the functionality of the sprinklers.

The plurality of indicator lights 12 further comprises a plurality of outlet status lights 14. The plurality of outlet status lights 14 is utilized to monitor the status of the plurality of electrical outlets 11. An arbitrary light from the plurality of outlet status lights 14 is positioned adjacent to a corresponding outlet from the plurality of electrical outlets 11. As a result, the arbitrary light is able to provide an indication of the power status of the corresponding outlet. For example, if the corresponding outlet is powered, the arbitrary light may be green. However, if the corresponding outlet is unpowered, the arbitrary light may be red.

The plurality of indicator lights 12 further comprises an overheating indicator light 15. The overheating indicator light 15 is utilized to determine if the control unit 4 is overheating or has reached an unsafe temperature during operation of the present invention. The overheating indicator light 15 is positioned on the front surface 2 for convenient visual assessment of the temperature of the control unit 4.

Figure 8:
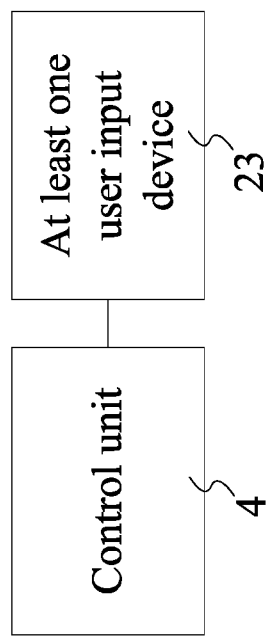
FIG. 8 is a diagram detailing electronic connections of the at least one user input device.

The present invention further comprises at least one user input device 23. The at least one user input device 23 is utilized to turn the present invention on or off and is also utilized to input various user commands to the present invention. The at least one user input device 23 is operably disposed on the housing structure 1, providing ease of access and use for the at least one user input device 23. As shown in FIG. 8, the at least one user input device 23 is electronically connected to the control unit 4 and as such, user commands inputted through the at least one user input device 23 are processed and implemented by the control unit 4.

The present invention further comprises a temperature sensor 20 and a heatsink 21 as shown in FIG. 9. The temperature sensor 20 is utilized to detect the temperature of the control unit 4 while the heatsink 21 is utilized to transfer heat generated from the control unit 4 away for dissipation. The temperature sensor 20 and the heatsink 21 are thermally coupled to the control unit 4, enabling the temperature sensor 20 to detect the temperature of the control unit 4 and allowing heat from the control unit 4 to be transferred to the heatsink 21. The temperature sensor 20 is operably coupled to the heatsink 21 through the control unit 4. As a result, the control unit 4 is able to monitor the temperature of the control unit 4 through the temperature sensor 20. The temperature sensor 20 and the heatsink 21 are positioned within the housing structure 1 along with the control unit 4.

The present invention further comprises at least one heat vent 22 that enables heat transferred from the control unit 4 to the heatsink 21 to be dissipated to the surrounding areas of the present invention. The at least one heat vent 22 traverses into a lateral surface 3 of the housing structure 1, adjacent to the heatsink 21. Heat transferred to the heatsink 21 from the control unit 4 may thus exit from within the housing structure 1 through the at least one heat vent 22.

Figure 10:
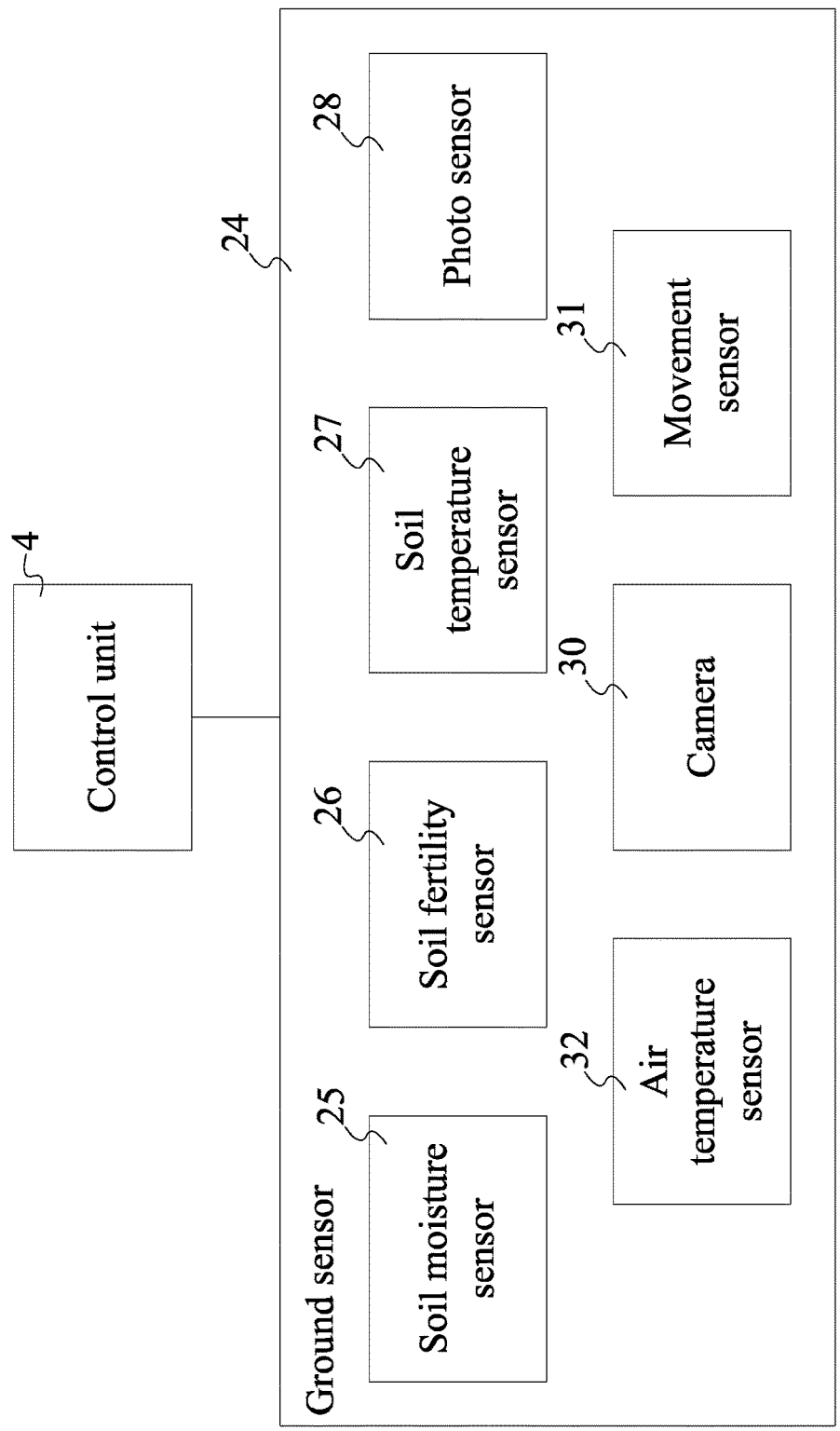
FIG. 10 is a diagram detailing electronic connections of the ground sensor.
Figure 11:
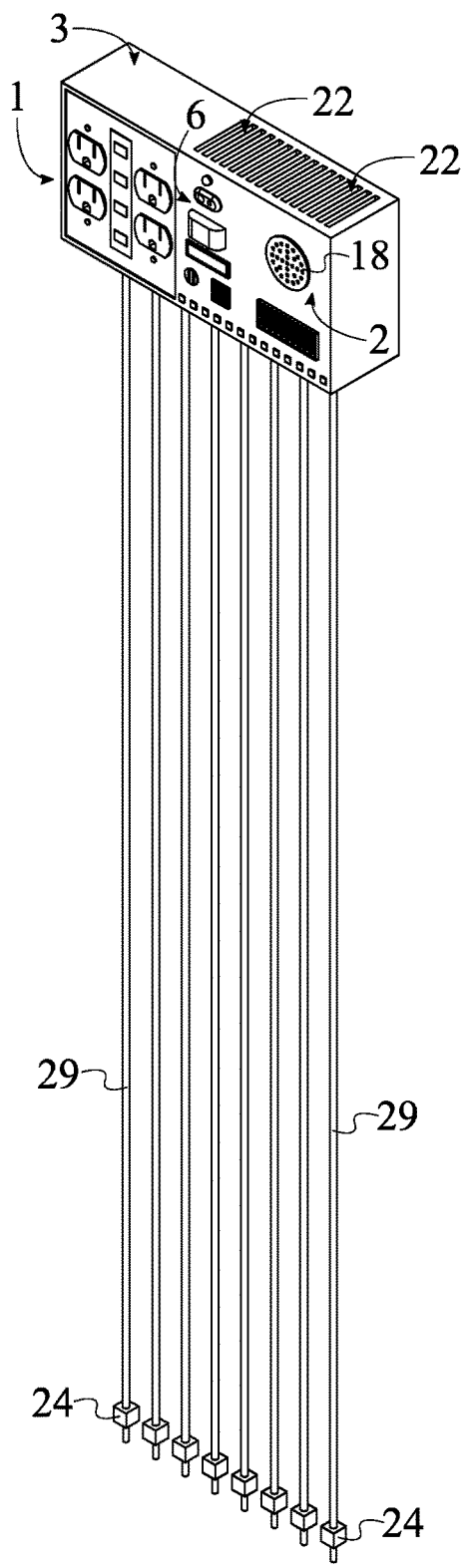
FIG. 11 is a perspective view of an embodiment of the present invention with the ground sensor and the tether.

In the embodiment of the present invention shown in FIG. 10 and FIG. 11, the at least one environmental sensor 6 further comprises a ground sensor 24. The ground sensor 24 is utilized to monitor and measure various properties of soil. The ground 24 sensor includes a soil moisture sensor 25, a soil fertility sensor 26, a soil temperature sensor 27, a photo sensor 28, an air temperature sensor 32, a camera 30, and a movement sensor 31. The present invention may thus be utilized to monitor and measure soil moisture, fertilizer absorption by plants, soil temperature, and light intensity on plants.

The ground sensor 24 may be wirelessly connected to the control unit 4. Alternatively, the ground sensor 24 may be connected to the housing structure 1 through a tether 29. The tether 29 additionally allows the ground sensor 24 to draw electrical power through the tether 29.

Although the present invention has been explained in relation to its preferred embodiment, it is understood that many other possible modifications and variations can be made without departing from the spirit and scope of the present invention as hereinafter claimed.

What is claimed is:

1. A smart electronic device management system comprising:
   a housing structure;
   a video capture device;
   at least one environmental sensor;
   a wireless communication module;
   a plurality of electrical outlets;
   a plurality of indicator lights;
   a control unit;
   the housing structure comprising a front surface;
   the video capture device being mounted into the front surface;
   the at least one environmental sensor, the plurality of electrical outlets and the plurality of indicator lights being mounted into the housing structure;
   the video capture device, the at least one environmental sensor, the wireless communication module, the wireless communication module, the plurality of electrical outlets and the plurality of indicator lights being electronically connected to the control unit;
   the control unit and the wireless communication module being enclosed within the housing structure;
   the control unit being configured to calculate a sprinkler schedule for the plurality of electrical outlets using data retrieved through the wireless communication module;
   the plurality of indicator lights comprising a plurality of sprinkler zone status lights, a plurality of outlet status lights and an overheating indicator light;
   the plurality of sprinkler zone status lights being linearly distributed on the front surface;
   an arbitrary light from the plurality of outlet status lights being positioned adjacent to a corresponding outlet from the plurality of electrical outlets;
   the overheating indicator light being positioned on the front surface;
   the at least one environmental sensor comprising a ground sensor; and
   the ground sensor comprising a soil fertility sensor, a soil temperature sensor, a photo sensor and an air temperature sensor.

2. The smart electronic device management system as claimed in claim 1 comprising:
   a power supply; and
   the power supply being electrically connected to the control unit, the at least one environmental sensor, the wireless communication module, the plurality of electrical outlets and the plurality of indicator lights.

3. The smart electronic device management system as claimed in claim 1, wherein the at least one environmental sensor comprises a light sensor.

4. The smart electronic device management system as claimed in claim 1, wherein the at least one environmental sensor comprises a humidity sensor.

5. The smart electronic device management system as claimed in claim 1 comprising:
   an ultrasonic pest repellent device;
   the ultrasonic pest repellent device being positioned on the front surface; and
   the ultrasonic pest repellent device being electronically connected to the control unit.

6. The smart electronic device management system as claimed in claim 5 comprising:
   the at least one environmental sensor comprising a motion sensor;
   the motion sensor being positioned on the front surface; and
   the motion sensor being operably coupled to the ultrasonic pest repellent device through the control unit.

7. The smart electronic device management system as claimed in claim 1 comprising:
   an audio-output device;
   the audio-output device being externally positioned on the housing structure; and
   the audio-output device being electronically connected to the control unit.

8. The smart electronic device management system as claimed in claim 7 comprising:
   a data storage device; and
   the data storage device being electronically connected to the audio-output device through the control unit.

9. The smart electronic device management system as claimed in claim 1 comprising:
   at least one user input device;

the at least one user input device being operably disposed on the housing structure; and the at least one user input device being electronically connected to the control unit.

10. The smart electronic device management system as claimed in claim 1 comprising:

a temperature sensor;

a heatsink;

the temperature sensor and the heatsink being thermally coupled to the control unit;

the temperature sensor being operably coupled to the heatsink through the control unit; and the temperature sensor and the heatsink being positioned within the housing structure.

11. The smart electronic device management system as claimed in claim 10 comprising:

at least one heat vent; and the at least one heat vent traversing into a lateral surface of the housing structure, adjacent to the heatsink.

12. The smart electronic device management system as claimed in claim 1, wherein the ground sensor comprises a soil moisture sensor, a camera and a movement sensor.

13. The smart electronic device management system as claimed in claim 1 comprising:

a tether; and the ground sensor being connected to the housing structure through the tether.

* * * * *